United States Patent [19]
Wendel

[11] 4,058,111
[45] Nov. 15, 1977

[54] SOLAR COLLECTOR

[75] Inventor: I. L. Wendel, St. Petersburg, Fla.

[73] Assignee: James L. Lowe, St. Petersburg, Fla.

[21] Appl. No.: 654,888

[22] Filed: Feb. 3, 1976

Related U.S. Application Data

[63] Continuation-in-part of Ser. No. 596,513, July 16, 1975.

[51] Int. Cl.$^2$ .............................. F24J 3/02; E04B 7/18
[52] U.S. Cl. ...................................... 126/271; 52/200
[58] Field of Search .................. 126/270, 271; 52/200, 52/81

[56] References Cited

U.S. PATENT DOCUMENTS

| | | | |
|---|---|---|---|
| 1,056,861 | 3/1913 | Walker | 126/271 |
| 2,918,023 | 12/1959 | Bettcher | 52/81 |
| 3,076,450 | 2/1963 | Gough et al. | 126/271 |
| 3,521,414 | 7/1970 | Malissa | 52/200 |
| 3,553,914 | 1/1971 | Van Der Boorn | 52/200 |
| 3,595,216 | 7/1971 | Lanciault | 126/271 |
| 3,665,661 | 5/1972 | Beckerer | 52/200 |
| 3,898,979 | 8/1975 | Medico, Jr. | 126/271 |
| 3,902,794 | 9/1975 | Abrams | 126/270 |

FOREIGN PATENT DOCUMENTS

| | | | |
|---|---|---|---|
| 1,245,740 | 10/1960 | France | 126/271 |

Primary Examiner—Lloyd L. King
Attorney, Agent, or Firm—William E. Mouzavires

[57] ABSTRACT

A solar collector adapted to be conveniently installed on a roof or similar structure includes a casing having a continuous bottom flange adapted to be secured to the roof and providing flashing for suitable roofing material. A continuous side wall extends upwardly from the flange and a continuous shoulder along the side wall and extends outwardly from a lower portion of the side wall to an upper portion thereof. A solar collector heat pan includes a generally flat heat plate having an upper face carrying typical tubing for a liquid to be heated by solar energy, the pan further having a continuous depending flange positioned on the casing shoulder with the plate substantially flush with the top edge of the casing. A light transmitting cover overlies the heat pan and has a continuous depending flange extending above the heat plate so that solar energy may engage the heat plate during relatively early and late daylight hours. The casing side wall is preferably solid and the cover flange extends about the upper portion of the side wall so that wind and foreign matter such as dust and precipitation are effectively prevented from entering below the heat pan within the cover.

3 Claims, 2 Drawing Figures

SOLAR COLLECTOR

This application is a continuation-in-part of my co-pending parent application Ser. No. 596,513, filed July 16, 1975, and hereby incorporated by reference for any matter not specifically disclosed herein.

This invention relates to a solar collector and, more particularly to a solar collector having a casing adapted to be mounted on a roof, or the like, and supporting a heat pan and a light transmitting cover.

BACKGROUND OF THE INVENTION

Solar collectors are commonly mounted on legs secured to a roof or other supporting structure, for example as shown in the previously identified parent which also discloses a dome shaped light transmitting cover with a depending flange encircling an inverted heat pan so that fluid carrying tubes on the upper face of the pan are exposed to solar energy during relatively early and late daylight hours, and entry of foreign matter within the cover is effectively prevented.

A patent showing a solar collector of passing interest is U.S. Pat. No. 3,595,216, in which the collector is swingably mounted on the roof of a vehicle and has a dome shaped cover received within supporting flanges of a base rather than encircling the flanges.

Numerous skylight patents are of passing interest including U.S. Pat. Nos. 2,693,156, 2,918,023 and 3,665,661. A skylight patent of greater interest is U.S. Pat. No. 3,553,914, in which a roof mounted casing has a generally dome shaped cover with opaque depending flanges encircling the top of the casing, and further has a bottom flange which may serve as flashing, and a shoulder which has no supporting function in this patent.

The present invention, in brief, is directed to a factory coordinated solar collector including a casing which carries a heat pan and a light transmitting cover, the collector being substantially easier to install in the field and providing a sturdier and more efficient construction than conventional solar collectors. Field installation is simplified by provision of a continuous bottom flange on the casing for attachment to the roof or similar supporting structure, this flange further serving as a typical flashing for roofing. A continuous side wall of the casing is preferably solid and is provided with a support for the heat pan, with a light transmitting dome shaped cover having a depending flange which encircles the top of the casing, thus providing an installation which effectively prevents the ingress of wind and precipitation and other foreign matter within the cover and the casing.

The combination of the heat pan and cover is generally in keeping with the teaching of the parent wherein the heat pan is inverted and has a heat plate with an upper face carrying the typical tubes for a fluid to be heated by solar energy, and the cover having a continuous depending flange encircling the pan and extending upwardly about the tubes to facilitate solar energy reaching the tubes during relatively early and late daylight hours, and effectively prevents entry of wind and foreign matter.

In addition to typical insulation which may be provided along the bottom of the heat pan, the casing may also be insulated to further reduce heat loss during relatively cold weather.

It is an object of this invention to provide a new and useful solar collector.

Another object is provision of a new and useful solar collector in which both the top and the bottom of the heat pan are effectively protected against wind and foreign matter such as precipitation by provision of a casing supporting the heat pan and receiving a generally dome shaped cover overlying the heat pan and having a continuous depending flange encircling the top of the casing.

These and other objects and advantages of the invention will be apparent from the following description and the accompanying drawing.

DESCRIPTION OF THE ILLUSTRATED EMBODIMENT

Figure 1:
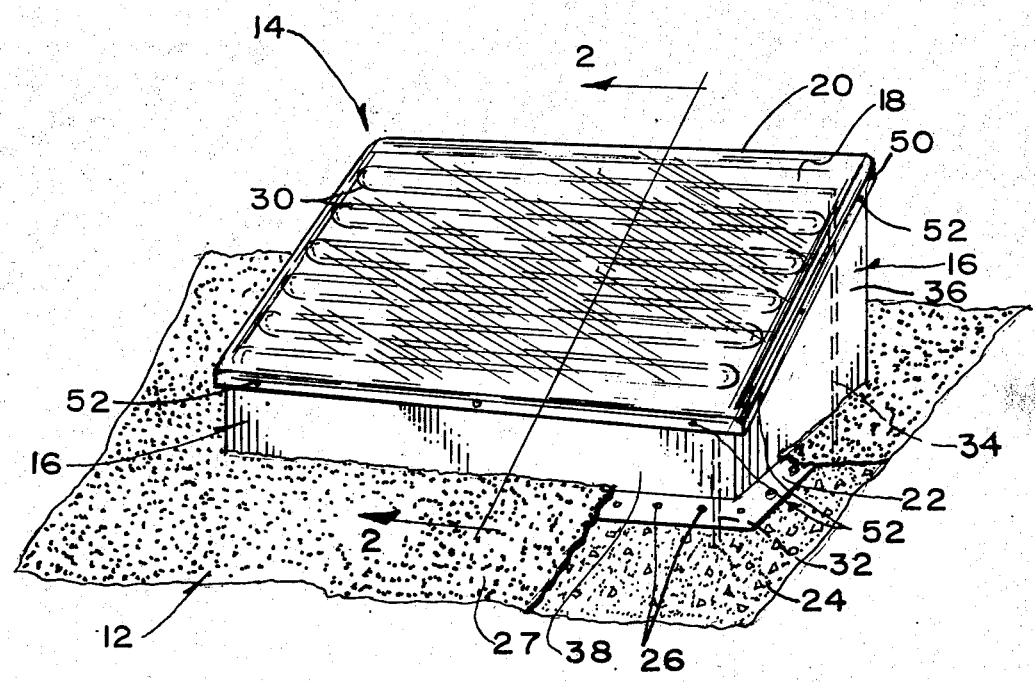
FIG. 1 is a fragmentary, schematic, perspective view of a solar collector of this invention mounted on a roof, with a portion broken away and removed for clearer illustration.

Referring first to FIG. 1 of the drawing, a flat roof 12 supports a solar collector 14 including a casing 16 which carries a heat pan 18 (FIG. 2) and a light transmitting dome shaped cover 20. In keeping with normal practice, the solar collector 14 is generally rectangular; and the casing 16 has a substantially continuous bottom flange 22 which is seated against and secured to a supporting structure 24 of the roof 12 in any suitable manner such as by studs 26 seated in a wooden or concrete roof. The flange 22 further serves as flashing for suitable roofing materials such as tar or asphalt paving 27, or the like.

Figure 2:
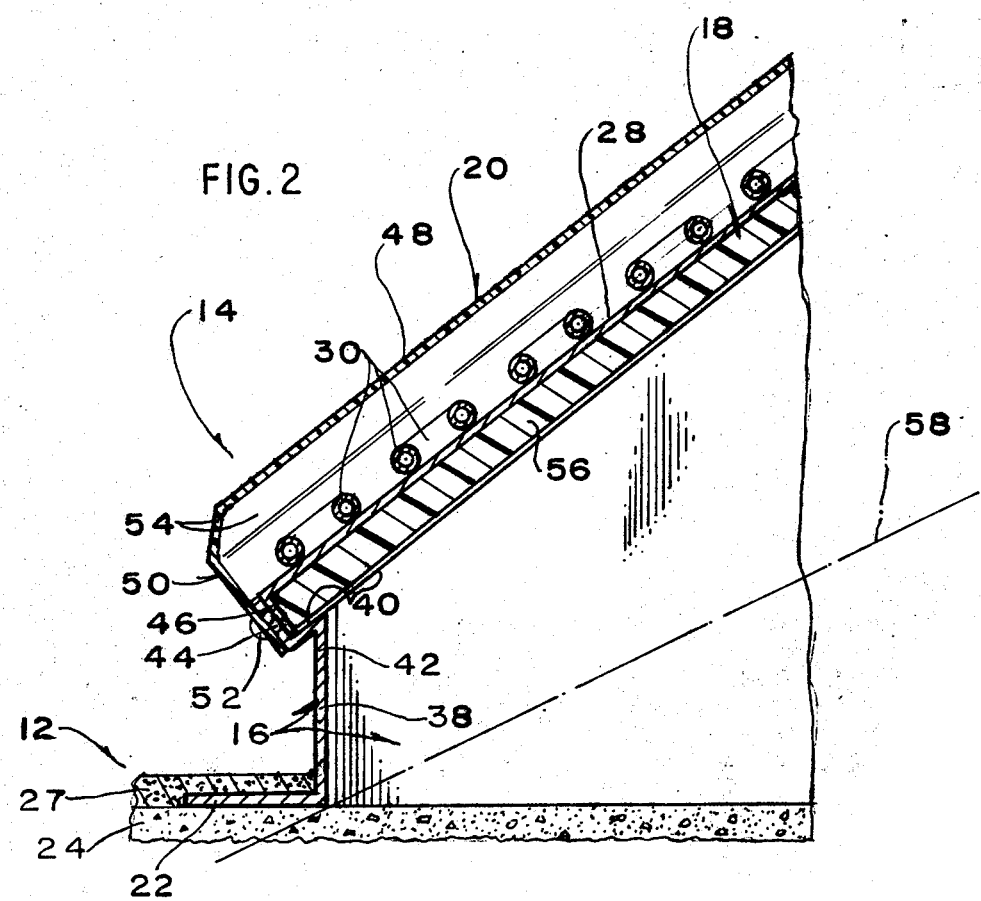
FIG. 2 is an enlarged, fragmentary, schematic, vertical sectional view taken generally along the line 2—2 in FIG. 1.

Referring to FIG. 2, heat pan 18 is inverted as shown in the parent, with an upper face of a heat plate 28 carrying a serpentine pattern of tubes 30 (FIG. 1) for a liquid to be heated by solar energy. Mounting of tubes 30 on the heat pan 18 is preferably as disclosed in the parent. A tube inlet 32 communicates with the free end of the lowermost tube and a tube outlet 34 communicates with the free end of the upper tube, as shown by the dashed lines in FIG. 1.

With continuing reference to FIG. 2, the casing 16 is generally rectangular and has a continuous side wall 36, a front wall 38 thereof being of substantially less height than a rear wall (not shown), and the front and rear walls being interconnected by inclined side walls. The heat pan 18 is supported on a substantially continuous shoulder 40 which is substantially parallel to the top edge of the casing 16 and is inclined at a desired angle in relationship to the sun for optimum receipt of solar energy by the heat pan. The inclination of the upper face of the heat pan plate 28 and the shoulder 20 is determined basically by the area in which the collector is to be installed and in the Tampa Bay area is generally between 35 and 40 degrees to the horizontal, while in northern Alaska the inclination may be almost vertical. Shoulder 40 is illustrated as formed integrally with the side wall 36, and extends outwardly from a lower portion 42 of the side wall to an upper portion 44 of the side wall. The upper portion 44 extends upwardly from the shoulder 40 and provides a continuous flange about a continuous depending flange 46 of the heat pan 18, the lower edge of the flange 46 being seated on the shoulder 40 with the upper face of the heat pan 20 substantially flush with the top edge of the flange 44.

Cover 20 has a body portion 48 generally parallel to and spaced above the heat plate 28 and the tubes 30, and has a continuous depending flange 50 encircling the casing flange 44 and secured thereto by a suitable screws 52 (FIG. 1) extending through apertures in the cover flange 50 and threaded through the casing flange 44 and the heat pan flange 46. Cover flange 50 is preferably provided with a continuous beveled portion 54, as shown in FIG. 2, for better passage of solar energy to the heat plate 18 during early and late daylight hours, as described in the parent.

The bottom of the heat pan 18 is preferably provided with suitable insulation 56 as described in the parent application, and the inner surfaces of the casing side wall 36, including both the lower portion 42 and the upper portion 44, as well as the upper face of the shoulder 40, may be provided with a similar insulation (not shown), and if desired the entire interior of the casing lower portion 42 may be packed with a loose insulation as fiberglas or the like.

The continuous side wall 36 of the casing 16 provides a stop against high winds which may lift and loosen a typical solar collector installation, and along with the dome shaped cover 20 and its depending continuous flange 50 which embraces the outer face of the casing flange 44, effectively prevents the ingress of wind, and precipitation and other foreign matter to within the casing and the cover.

Any suitable fabricating technique may be utilized in construction of the casing 16 which is preferably of galvanized steel or aluminum sheet metal. The inclination of the heat pan 18 may be set as desired. For a pitched roof installation, as indicated by phantom line 58 in FIG. 2, the casing may be laid out to provide the desired inclination of the heat pan on any type of roof. In a pitched roof installation, the casing bottom flange 22 would be in the plane of the pitched roof and the lower run would overly typical shingle or other suitable roofing, and the roofing material would overly the side and top runs of the casing bottom flange 22, in keeping with typical roofing installation technique.

While this invention has been described and illustrated with reference to a particular embodiment in a particular environment, various changes may be apparent to one skilled in the art and the invention therefore is not to be limited to such embodiment or environment, except as set forth in the appended claims.

What is claimed is:

1. A solar collector comprising, a casing positioning a solar collector heat pan at a desired inclination for receiving solar energy, said casing having a substantially continuous side wall with an upper edge portion, said casing having first means for mounting said wall on a support, and said casing having shoulder means at and extending along said upper edge portion and supporting the heat pan facing upwardly within said casing, said wall including an upper portion extending upwardly from said shoulder means to an upper edge of said edge portion, said heat pan including a heat plate substantially flush with said edge, and a solar energy transmitting cover overlying said upper edge portion and mounted on said casing, said cover including a substantially continuous depending solar energy transmitting flange extending upwardly from said edge and said heat plate for passage of solar energy through the last said flange, and the last said flange having a lower portion encircling said upper portion of said wall for effectively preventing entry of wind or foreign matter within the cover.

2. A solar collector as set forth in claim 1 in which said side wall is substantially solid for effectively preventing ingress of wind, and precipitation and other foreign matter below said heat pan.

3. A solar collector in combination with said mounting as set forth in claim 2 and including said heat pan and in which said first means comprises a substantially continuous flange along the bottom of said side wall and extending outwardly therefrom and providing flashing about said side wall and further providing means for securing said casing to a roof, said second means comprises a substantially continuous shoulder integral with said side wall and extending outwardly from the side wall to said upper portion of said side wall, said heat pan includes a substantially continuous flange depending from said heat plate and received on said shoulder, and said cover includes a substantially continuous, depending, solar energy transmitting flange extending above said heat plate and encircling said upper portion of said side wall and effectively preventing ingress of wind, precipitation and other foreign matter within said cover while permitting passage of solar energy through the last said flange to said heat plate during relatively early and late daylight hours.

* * * * *